US012032533B2

(12) United States Patent
Eswaran et al.

(10) Patent No.: US 12,032,533 B2
(45) Date of Patent: *Jul. 9, 2024

(54) CODE GENERATOR PLATFORM FOR DATA TRANSFORMATION

(71) Applicant: Capital One Services, LLC, McLean, VA (US)

(72) Inventors: Manigandan Eswaran, McKinney, TX (US); Surya Ram Hareesh Vemula, Frisco, TX (US); Ramesh Babu Singamsetty, McKinney, TX (US); Pratap Kumar Mittapally, Frisco, TX (US); Gauri Kelkar, Somerville, NJ (US); SaiPriya Rayala, Plano, TX (US); Vibha Mohan, Austin, TX (US); Alagushankar Sathasivam, Chennai, TN (US)

(73) Assignee: Capital One Services, LLC, McLean, VA (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/060,723

(22) Filed: Dec. 1, 2022

(65) Prior Publication Data

US 2023/0085750 A1    Mar. 23, 2023

Related U.S. Application Data

(63) Continuation of application No. 16/713,340, filed on Dec. 13, 2019, now Pat. No. 11,526,475, which is a
(Continued)

(51) Int. Cl.
G06F 16/00    (2019.01)
G06F 16/21    (2019.01)
(Continued)

(52) U.S. Cl.
CPC ........ *G06F 16/213* (2019.01); *G06F 16/2448* (2019.01); *G06F 16/252* (2019.01); *G06F 16/258* (2019.01)

(58) Field of Classification Search
CPC .. G06F 16/213; G06F 16/2448; G06F 16/252; G06F 16/258
See application file for complete search history.

(56) References Cited

U.S. PATENT DOCUMENTS 5,611,076 A    3/1997  Durflinger et al.
6,816,848 B1  11/2004  Hildreth et al.
(Continued)

OTHER PUBLICATIONS

Chaudhari et al., "Database Transformation to Build Data-set For Data Mining Analysis—A Review," 2015 International Conference on Computing Communication Control and Automation, 2015 IEEE, pp. 386-389. (Year: 2015).*
(Continued)

*Primary Examiner* — Cheryl Lewis
(74) *Attorney, Agent, or Firm* — Harrity & Harrity, LLP

(57) ABSTRACT

A code generator platform may receive source metadata and a target data model. The code generator platform may determine a parameter, of the target data model, that is associated with the attribute. The code generator platform may map, based on the attribute and the source metadata, the data to the parameter of the target data model. The code generator platform may generate, based on mapping the data to the parameter, data transformation code associated with the data and the target data model, wherein the data transformation code, when executed, generates target data that corresponds to the data according to the target data model. The code generator platform may perform an action associated with the data transformation code to permit the data transformation code to be executed in order to update a target database with the target data.

20 Claims, 7 Drawing Sheets

Related U.S. Application Data continuation of application No. 16/518,377, filed on Jul. 22, 2019, now Pat. No. 10,540,334.

(51) Int. Cl.
 *G06F 16/242* (2019.01)
 *G06F 16/25* (2019.01)

(56) References Cited

U.S. PATENT DOCUMENTS

| | | |
|---|---|---|
| 7,152,229 B2 | 12/2006 | Chong et al. |
| 7,366,914 B2 | 4/2008 | Graunke |
| 10,540,334 B1 | 1/2020 | Eswaran et al. |
| 11,526,475 B2 | 12/2022 | Eswaran et al. |
| 2002/0095430 A1 | 7/2002 | Egilsson et al. |
| 2013/0055197 A1 | 2/2013 | Balan et al. |
| 2016/0321307 A1 | 11/2016 | Dingman et al. |

OTHER PUBLICATIONS

Czarnecki et al., "Classification of Model Transformation Approaches," OOPSLA'03 Workshop on Generative Techniques in the Context of Model-Driven Architecture, pp. 1-17. (Year: 2003).*

Baek et al., "The OpenTM Transactional Application Programming Interface," IEEE 16 International Conference on Parallel Architecture and Compilation Techniques, Sep. 15-19, 2007, pp. 1-12.

Tarau., "An Embedded Declarative Data Transformation Language," 11th ACM SIGPLAN Conference on Principles and Practice of Declarative Programming, Sep. 2009, pp. 171-182.

\* cited by examiner

CODE GENERATOR PLATFORM FOR DATA TRANSFORMATION

RELATED APPLICATIONS

This application is a continuation of U.S. patent application Ser. No. 16/713,340, filed Dec. 13, 2019 (now U.S. Pat. No. 11,526,475), which is a continuation of U.S. patent application Ser. No. 16/518,377, filed Jul. 22, 2019 (now U.S. Pat. No. 10,540,334), which are incorporated herein by reference.

BACKGROUND

A data model is a model that organizes data of a dataset and/or standardizes relationships between the data of the dataset. Accordingly, the data model may be used to define and/or format the data to permit the dataset to be transformed for analysis and/or to provide information associated with the dataset.

SUMMARY

According to some implementations, a method may include receiving source metadata associated with a source dataset; selecting, based on the source metadata, a target data model from a plurality of target data models, wherein the target data model is to be used to process the source dataset; identifying, based on the source metadata, attributes of the source dataset; identifying parameters of the target data model that correspond to the attributes; mapping the attributes to the parameters based on the target data model; generating, based on mapping the attributes to the parameters, data transformation code based on the source metadata and the target data model, wherein the data transformation code includes: data manipulation language (DML) code, a scheduling code, data definition language (DDL) code, a user interface code, and an application programming interface (API) call; and causing the data transformation code to be executed, wherein the data transformation code, when executed, generates a target dataset, according to the target data model, for the source dataset.

According to some implementations, a device may include one or more memories; and one or more processors, communicatively coupled to the one or more memories, configured to: receive source metadata, wherein the source metadata is associated with a source dataset; identify a target data model based on the source metadata, wherein the target data model is to be used to process the source dataset; identify, based on the source metadata, attributes of the source dataset; identify parameters of the target data model that correspond to the attributes; map the attributes to the parameters based on the target data model; generate, based on mapping the attributes to the parameters, data transformation code based on the source metadata and the target data model, wherein the data transformation code includes a plurality of structured query language (SQL) codes, a scheduling code, and a plurality of application programming interface (API) calls; and cause the data transformation code to be executed to update a target dataset with data from the source dataset according to the target data model.

According to some implementations, a non-transitory computer-readable medium may store one or more instructions. The one or more instructions, when executed by one or more processors of a device, may cause the one or more processors to: receive source metadata, wherein the source metadata is associated with a source dataset, and wherein the source dataset includes data having an attribute; receive a target data model, wherein the target data model is associated with the source dataset; determine a parameter, of the target data model, that is associated with the attribute; map, based on the attribute and the source metadata, the data to the parameter of the target data model; generate, based on mapping the data to the parameter, data transformation code associated with the data and the target data model, wherein the data transformation code, when executed, generates target data that corresponds to the data according to the target data model; and perform an action associated with the data transformation code to permit the data transformation code to be executed in order to update a target database with the target data.

DETAILED DESCRIPTION

Figure 1A:
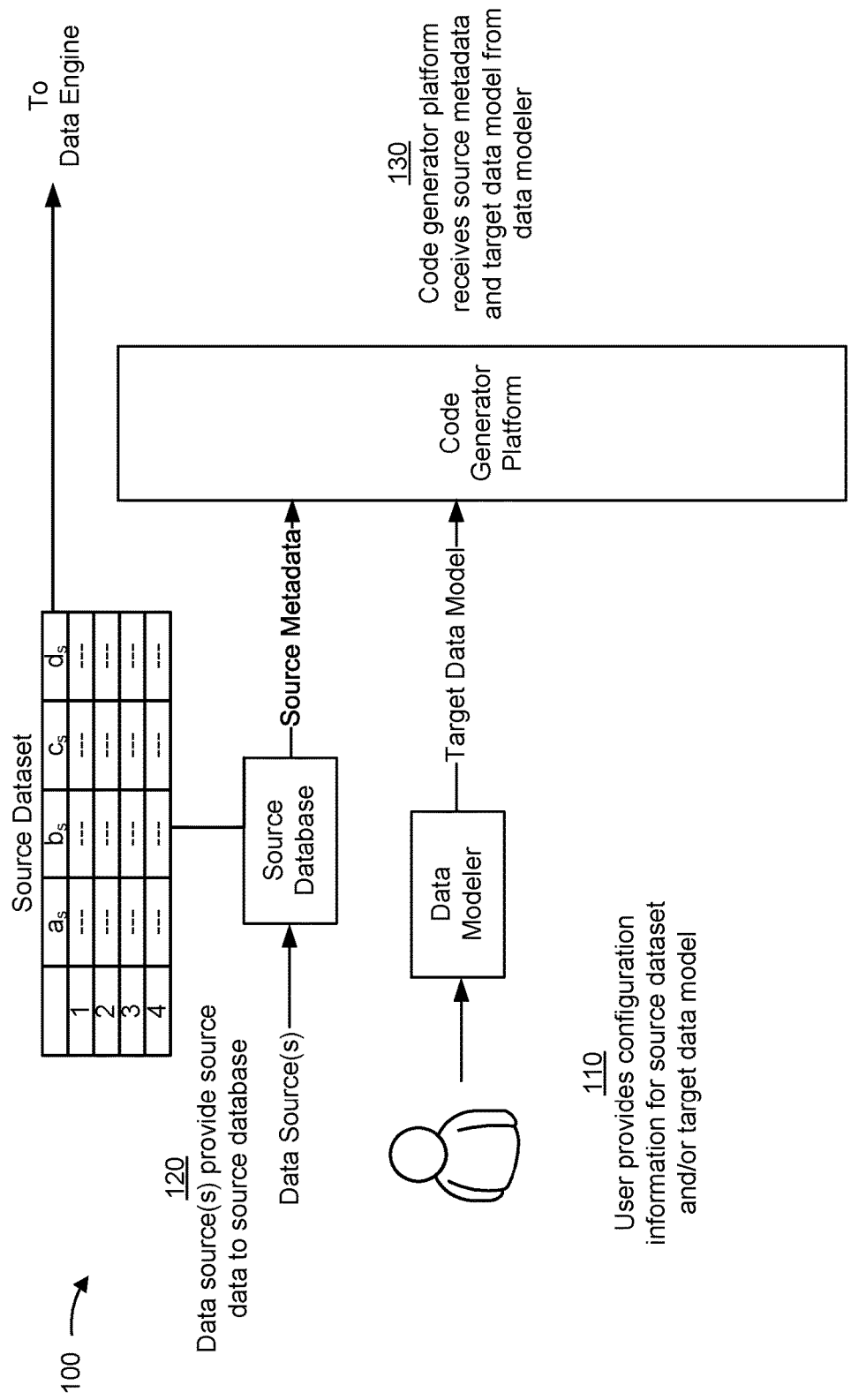
FIGS. 1A and 1B are diagrams of one or more example implementations described herein.

The following detailed description of example implementations refers to the accompanying drawings. The same reference numbers in different drawings may identify the same or similar elements.

In some instances, a source dataset may be used and/or transformed to produce a target dataset (e.g., a related dataset that indicates particular information associated with the source dataset). In such cases, data transformation code, associated with a data model, may be generated to permit the related dataset to be generated, configured, and/or presented in a particular manner according to a data model. Furthermore, the data model may be a specific data model (e.g., a data model that is specified by a user, a data model that is associated with the source dataset, and/or the like) that has particular and/or specific formatting for the data transformation code.

In previous techniques, creating data transformation code to use and/or transform data in accordance with a data model involves extensive and/or complex development processes, testing processes, and/or the like. For example, previous techniques typically involve developing certain elements of the data transformation code from scratch. In such cases, one or more complex systems may be utilized for researching the requirements for the data transformation code, for identifying formatting for the data transformation code, for generating and/or tracking metadata for the data transformation code, for building and/or deploying the data transformation code to appropriate devices and/or locations, etc. Such complex systems may consume and/or require a plurality of computing resources (e.g., processing resources, memory resources, storage resources, and/or the like) and/or network resources (e.g., communication resources involved in obtaining and/or exchanging information associated with the development of the data transformation code between the complex systems).

According to some implementations, the present disclosure describes a code generator platform that permits relatively quick and efficient generation of data transformation code to generate a target dataset from a source dataset according to one or more data models. In some implementations, the code generator platform may utilize one or more preconfigured data models to generate the data transformation code. For example, the code generator platform may select a data model to facilitate generation of the data transformation code. The data model may be associated with a particular user input, may be provided within a particular user input, and/or the like. As described herein, the code generator platform may determine parameters of the data model, map source data from the source dataset to the parameters (e.g., based on an attribute of the source data), generate the data transformation code based on the mapped source data, and distribute the data transformation code (or portions of the data transformation code) to permit a target dataset to be generated from the data transformation code and/or information associated with the target dataset to be presented for analysis. As described herein, the data transformation code may include one or more structured query language (SQL) codes, a scheduling code, an application programming interface (API) code, and/or the like.

In some implementations described herein, the code generator platform may enable data lineage of the target dataset to be maintained and/or monitored to permit errors associated with transformations of the source dataset to be detected. For example, the code generator platform may generate data transformation code that provides record information from a metadata repository associated with the target database. In this way, the record information can be stored and/or maintained with the target dataset (e.g., in a target database) to enable data lineage associated with the target dataset to be tracked.

Furthermore, some implementations described herein use a rigorous, computerized process to perform tasks or activities that were not previously performed. For example, previously, there did not exist a technique to receive a source dataset, map attributes of the source dataset to parameters of a target data model (which may be received in association with the source dataset and/or selected based on the source dataset), and generate data transformation code based on the source dataset and target data model to permit a target dataset to be generated and/or updated according to the source dataset. Furthermore, the process for generating the data transformation code, as described herein, conserves computing resources (e.g., processor resources, memory resources, and/or the like) that would otherwise be wasted by repeatedly obtaining a data model, determining code formatting according to a data model, transferring information associated with developing the data transformation code between systems, and/or the like. In this way, the code generator platform described herein enables quick and efficient generation of data transformation code to generate and/or update target datasets by using stored data models and/or monitored source datasets, thus conserving computing resources, network resources, and/or the like.

Figure 1B:
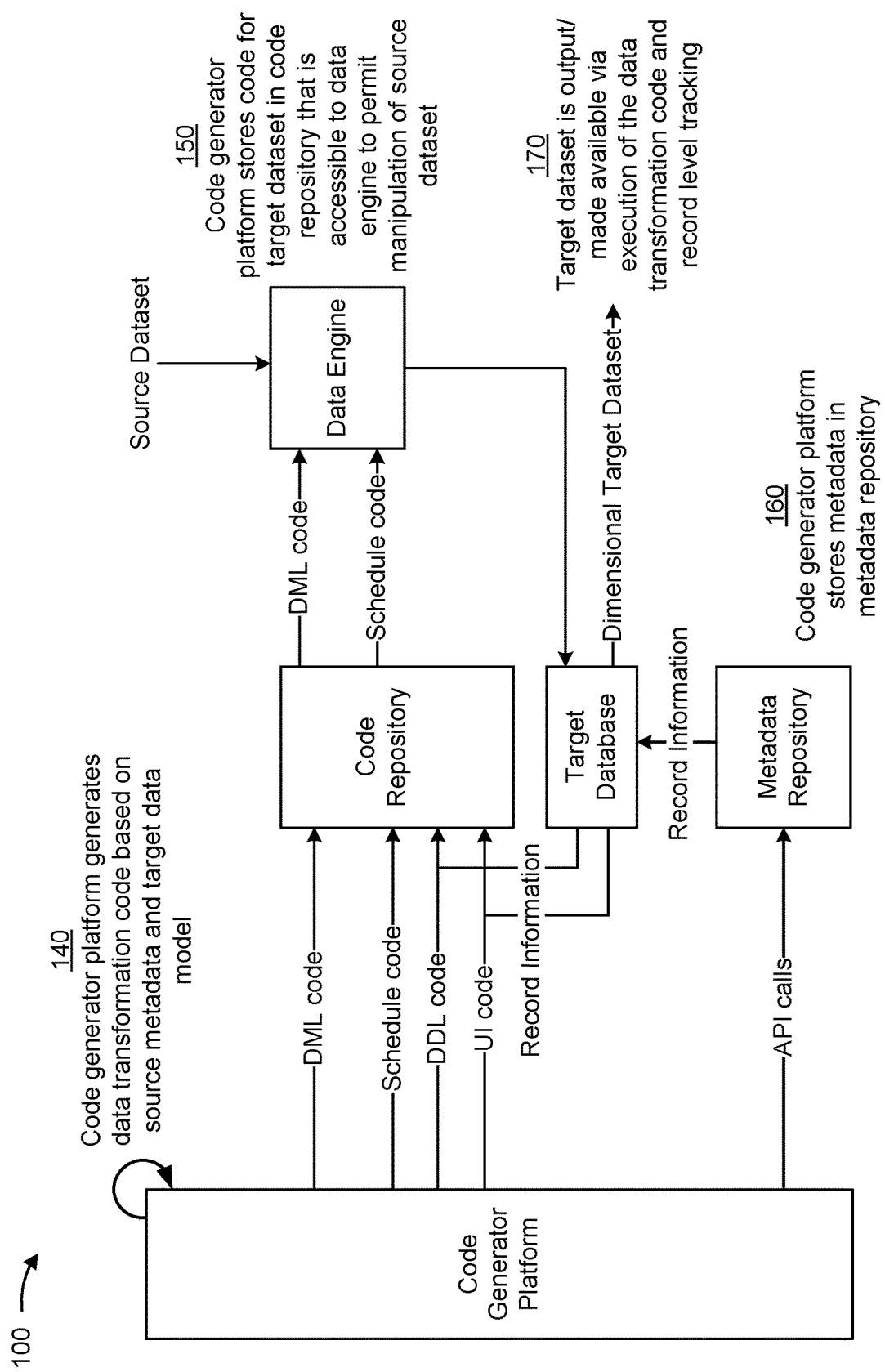

FIGS. 1A and 1B are diagrams of an example implementation 100 described herein. Example implementation 100 includes a code generator platform, a source database, a data modeler, a code repository, a data engine, a target database, and a metadata repository. As described herein, the code generator platform may generate data transformation code based on a source dataset (e.g., from the source database) and a target data model (e.g., from the data modeler). The data transformation code may be executed to generate and/or update a target dataset according to the source dataset.

As shown in FIG. 1A, and by reference number 110, a user provides, to the data modeler, configuration information for a source dataset and/or a target data model. For example, the user may indicate (e.g., to the data modeler and/or the code generator platform) which data from the source dataset is to be used in association with the target data model to generate a target dataset. Additionally, or alternatively, the user may indicate a mapping of attributes of the source dataset to parameters of the target data model.

In some implementations, the user may indicate when and/or how a target data model is to be used to transform data from the source dataset into a target dataset. For example, the user may define a schedule for transforming the source dataset using the target data model, may define that the source dataset is to be transformed using the target data model based on an event (e.g., based on source data being added to the source database), and/or the like. According to some implementations, the code generator platform may generate code that converts the source dataset (e.g., from the table format) to the target dataset.

In some implementations, the configuration information may include a mapping of a source, of the source dataset, to the target data model. For example, the source may correspond to an entity (e.g., an individual and/or organization) that is responsible for generating and/or updating the source data in the source database. In some implementations, the source may provide the target data model to the data modeler. Additionally, or alternatively, the user, via a user input, may identify the source dataset in association with a target data modeler when providing configuration information associated with the source dataset and/or target data model. Accordingly, the source dataset may include the generated and/or updated source data that is to be transformed into target data of a target dataset based on execution of the data transformation code generated by the code generator platform, as described herein.

In this way, the user may provide configuration information to the data modeler and/or the code generator platform to permit the code generator platform to use the target data model and/or source dataset to generate data transformation code that can be executed to generate a target dataset based on the source dataset.

As further shown in FIG. 1A, and by reference number 120, a data source provides source data to the source database. The source data may include data that corresponds to and/or is representative of any type of information. For example, the source data may correspond to and/or be representative of financial information, account information, user information, business information (or enterprise information), statistical information, analytical information, and/or the like. The source data may correspond to new data that is to be added to the source database, replacement data that is to replace data in the source database, data that removes or clears data from the source database, and/or the like. Accordingly, the source data may correspond to data that generates the source database (or at least a portion of the source database) and/or a source dataset of the source database, the source data may correspond to data that updates the source database and/or a source dataset of the source database, and/or the like.

In some implementations, the source database may include source metadata associated with the source database and/or a source dataset of the source database. For example, the source metadata for a source dataset may include information that identifies one or more characteristics of the source data, such as a business description (e.g., a purpose, a use, a context, and/or the like) associated with the source dataset, a classification of the source dataset (e.g., that identifies a type of data in the source dataset), a structure of the source dataset (e.g., a table, an index, a graph, and/or the like), one or more relationships among the source data and/or to other source data, and/or the like. Therefore, the source database may include one or more source datasets and corresponding metadata associated with the one or more source datasets.

The source database and/or the source dataset (which may be a set of the source data in the source database) may be organized in any suitable manner. For example, the source database and/or the source dataset may include and/or be implemented by a table, an index, a graph, and/or the like. In some implementations, the source database and/or the source dataset may include source data in a table format (e.g., that has rows defined by objects and/or and columns defined by attributes).

In this way, one or more data sources may provide data to the source database to permit the code generator platform to generate data transformation code associated with a source dataset of the source database and/or a target data model from the data modeler.

As further shown in FIG. 1A, and by reference number 130, the code generator platform receives source metadata associated with the source dataset from the source database and a target data model from the data modeler.

Additionally, or alternatively, the code generator platform may monitor the source metadata and/or source dataset to detect an event associated with a source dataset. For example, the code generator platform may monitor the source database to determine whether source data associated with a source dataset has been added, updated, removed, and/or the like in the source database. In such cases, when the code generator platform detects such an event, the code generator platform may obtain the source metadata from the source dataset from the source database, and/or cause the data engine to obtain the source dataset.

In some implementations, the code generator platform may select a target data model from the data modeler and/or request that the target data modeler provide the target data model to the code generator platform. For example, the code generator platform may select the target data model based on source metadata that is associated with an event and/or a characteristic (e.g., an attribute, a type, and/or the like) of source data involved in an event. The source metadata may include information associated with one or more attributes of the source dataset. For example, the source metadata may identify a change (e.g., an edit, an addition, a deletion, and/or the like) to an attribute, a source of a change to an attribute, timing associated with a change to the attribute, a format of the source dataset, a change to the formatting of the source dataset, and/or the like. In this way, the source metadata may indicate information associated with the source dataset.

In this way, the code generator platform may receive a source dataset, source metadata, and a target data model to permit the code generator platform to generate data transformation code that, when executed, generates a target dataset corresponding to the source dataset and the target data model.

As shown in FIG. 1B, and by reference number 140, the code generator platform generates data transformation code based on the source metadata and the target data model. For example, the code generator platform may automatically map, based on the source metadata, source data with particular attributes to parameters of the target data model (e.g., based on the attributes, based on the source metadata, and/or the like). The data transformation code may include a structured query language (SQL) code (e.g., one or more sets of code, such as executable instructions), a scheduling code (e.g., a JavaScript Object Notation file), one or more API calls, and/or the like. In this way, the generated data transformation code, when executed, may permit the source dataset to be converted to a target dataset according to the target data model.

As described herein, SQL codes of the data transformation code may include one or more sets of codes that are used to generate and/or deliver a target dataset (e.g., based on execution of the sets of code). For example, the data transformation code may include a data manipulation language (DML) code that permits the data engine (e.g., by executing the DML code) to add (or insert) data into the target database, remove data from the target database, update data in the target database, and/or the like. Accordingly, the DML code enables the data engine to generate the target dataset based on an operation defined by the DML code. Additionally, or alternatively, the data transformation code may include a data definition language (DDL) code that, when executed by the data engine, alters a schema (e.g., changes a table, changes a field, changes an index, changes a relationship, changes a query, and/or the like associated with a target dataset in the target database). In some implementations, the DDL code, when executed, may cause a target dataset to be configured in a dimensional model format. The dimensional model format may be a different format than the format of the data in the source dataset. Furthermore, the data transformation code may include a user interface code that defines role-based access to the target dataset (e.g., using user credentials), display features (e.g., graphics, pixel values, and/or the like) for the target dataset, and/or the like.

In some implementations, the data transformation code includes a scheduling code that indicates when one or more of the other codes of the data transformation code are to be executed. For example, the scheduling code may be a JSON configuration file that includes event-based scheduling for updating the target dataset, displaying content (e.g., via a user interface) associated with the target dataset, altering a configuration of the target dataset, and/or the like. The scheduling code may configure the data engine to monitor for one or more events associated with the target database and/or code repository that may initiate the execution of one or more codes of the data transformation code. In this way, the scheduling code may define when a data engine is to execute the data transformation code.

In some implementations, the code generator platform may generate one or more API calls associated with metadata registrations in association with generating the data transformation code. In some implementations, the API calls are generated as part of the data transformation code, such that an API call enables access to metadata in the metadata repository during execution of one or more other codes (e.g., a DML code, a DDL code, user interface code, and/or the like).

As described herein, the code generator platform may identify attributes of the source dataset and/or corresponding parameters of the target data model and map the attributes to corresponding parameters of the target data model. The code generator platform may map the attributes to the parameters based on the source metadata, which may include and/or identify one or more characteristics of the source dataset (e.g., format of the source data, purpose of the source data, relationships of the source data, types of the source data, and/or the like).

In some implementations, the parameters of the target data model may be determined and/or defined by a user input (e.g., the user input that identifies and/or includes the configuration information). In such cases, the user input may identify one or more constraints associated with the attributes of the source data. For example, the constraints may indicate that one or more of values of the source data for certain attributes are to be and/or remain within particular boundaries, that values that satisfy one or more thresholds are to trigger one or more events (e.g., generation of the data transformation code), and/or the like. In some implementations, the parameters may correspond to one or more fields (e.g., entry items, such as text fields, numeric fields, and/or the like) of SQL codes of the data transformation code. For example, when generating the data transformation code, the code generator platform may transpose source data associated with certain attributes into corresponding fields of the DML code, DDL code, user interface code, scheduling code, and/or the like to generate the data transformation code.

In this way, the code generator platform may generate data transformation code based on the source dataset, the source metadata, and the target data model to permit the data engine to execute the data transformation code to generate and/or update a target dataset corresponding to the source dataset.

As further shown in FIG. 1B, and by reference number 150, the code generator platform stores code for the target dataset in the code repository that is accessible to a data engine to permit manipulation of the source dataset. For example, after the data transformation code is generated, the code generator platform may store the DML code, the scheduling code, the DDL code, and the user interface code in the code repository.

The code generator platform may store the DDL code in the target database. For example, the DDL code may be stored in association with a target dataset (e.g., in a location associated with the target dataset) to define data relationships of the target dataset. Moreover, the code generator platform may store the user interface code in the target database such that when the data engine executes an access request to the target database, the user interface code is executed in accordance with the target dataset to enable role-based access to the target dataset.

In some implementations, the code generator platform may provide (e.g., cause the code repository to forward) the DML code and/or scheduling code to the data engine. In this way, the data engine may be able to execute the DML code and/or scheduling code to generate and/or update the target dataset (e.g., by executing the DML code at a time defined by the scheduling code).

In this way, the code generator platform may permit the data engine to access the DML code, the scheduling code, the DDL code, and/or the user interface code to generate target data for a target dataset (e.g., via the DML code and/or scheduling code), configure the target data in a target database (e.g., via the DDL code), and/or present the information (e.g., via the user interface code) associated with a target dataset As further shown in FIG. 1B, and by reference number 160, the code generator platform stores metadata in the metadata repository. The API calls may be stored as metadata registrations that provide record information associated with the source dataset, the generated data transformation code, and/or the like. In some implementations, the API calls, when accessed and/or executed, are to cause the target database to obtain record information from the metadata repository and/or cause the metadata repository to provide the record information to the target database. The record information may be stored as data lineage tracking data. For example, such data lineage tracking data may identify any and/or all changes to the target database, any and/or all generated data transformation code, timing (or events) associated with changes to the target database and/or generated data transformation code, source information associated with the changes to the target database (and/or the source database), and/or the like. Similarly, as shown, the target database may receive such record information associated with the DDL code and the user interface code.

In this way, the code generator platform may generate data transformation code that is configured to maintain (e.g., store, track, and/or the like) data lineage associated with the source data based on metadata of the source data.

As further shown in FIG. 1B, and by reference number 170, the target dataset and record level tracking is output and/or made available via execution of the data transformation code (e.g., by the data engine). In some implementations, the code generator platform may cause the data engine to execute the data transformation code (e.g., by providing the data transformation code, by sending instructions, by triggering an event, and/or the like).

In some implementations, the data engine may receive the source dataset based on source data being added to the source database (e.g., while, before, and/or in association with the code generator generates the data transformation code). For example, the source database may be configured to notify and/or provide a source dataset that is updated by an event (e.g., an addition of source data, an update to source data of the source dataset, a removal of source data from a source dataset, and/or the like). As shown, the source dataset is in a table format (with rows 1, 2, 3, 4 and columns $a_s$, $b_s$, $c_s$, $d_s$). The source dataset may be provided to the data engine as structured and/or unstructured data. As described herein, when the data engine executes an SQL code of the data transformation code, the data engine may generate a target dataset for the source dataset according to the target data model. In this way, the code generator platform may perform an action associated with the data transformation code to permit the data transformation code to be executed in order to update a target database.

Accordingly, based on source data being added to a source dataset and a target data model, the code generator platform facilitates generation of data transformation code to update a target dataset, as described herein. The code generator platform may serve as a centralized system that maintains and/or utilizes one or more preconfigured data models to generate data transformation code that can be executed on the source dataset to update the target dataset and/or maintain data lineage of the target dataset. Accordingly, the code generator platform may improve timing associated with generating the data transformation code (e.g., by permitting real-time generation of the data transformation code), reduce an amount of resources required to generate the data transformation code (e.g., computing resources of several complex systems, network resources between such complex systems, and/or the like), and improve performance of the generated data transformation code.

Furthermore, some implementations described herein use a rigorous, computerized process to perform tasks or activities that were not previously performed. For example, previously, there did not exist a technique to receive a source dataset, map attributes of the source dataset to parameters of a target data model (which may be received in association with the source dataset and/or selected based on the source dataset), and generate data transformation code based on the source dataset and target data model to permit a target dataset to be generated and/or updated according to the source dataset. Furthermore, the process for generating the data transformation code, as described herein, conserves computing resources (e.g., processor resources, memory resources, and/or the like) that would otherwise be wasted by repeatedly obtaining a data model, determining code formatting according to a data model, transferring information associated with developing the data transformation code between systems, and/or the like. In this way, the code generator platform described herein enables quick and efficient generation of data transformation code to generate and/or update target datasets by using stored data models and/or monitored source datasets, thus conserving computing resources, network resources, and/or the like.

As indicated above, FIGS. 1A and 1B are provided merely as one or more examples. Other examples may differ from what is described with regard to FIGS. 1A and 1B.

Figure 2:
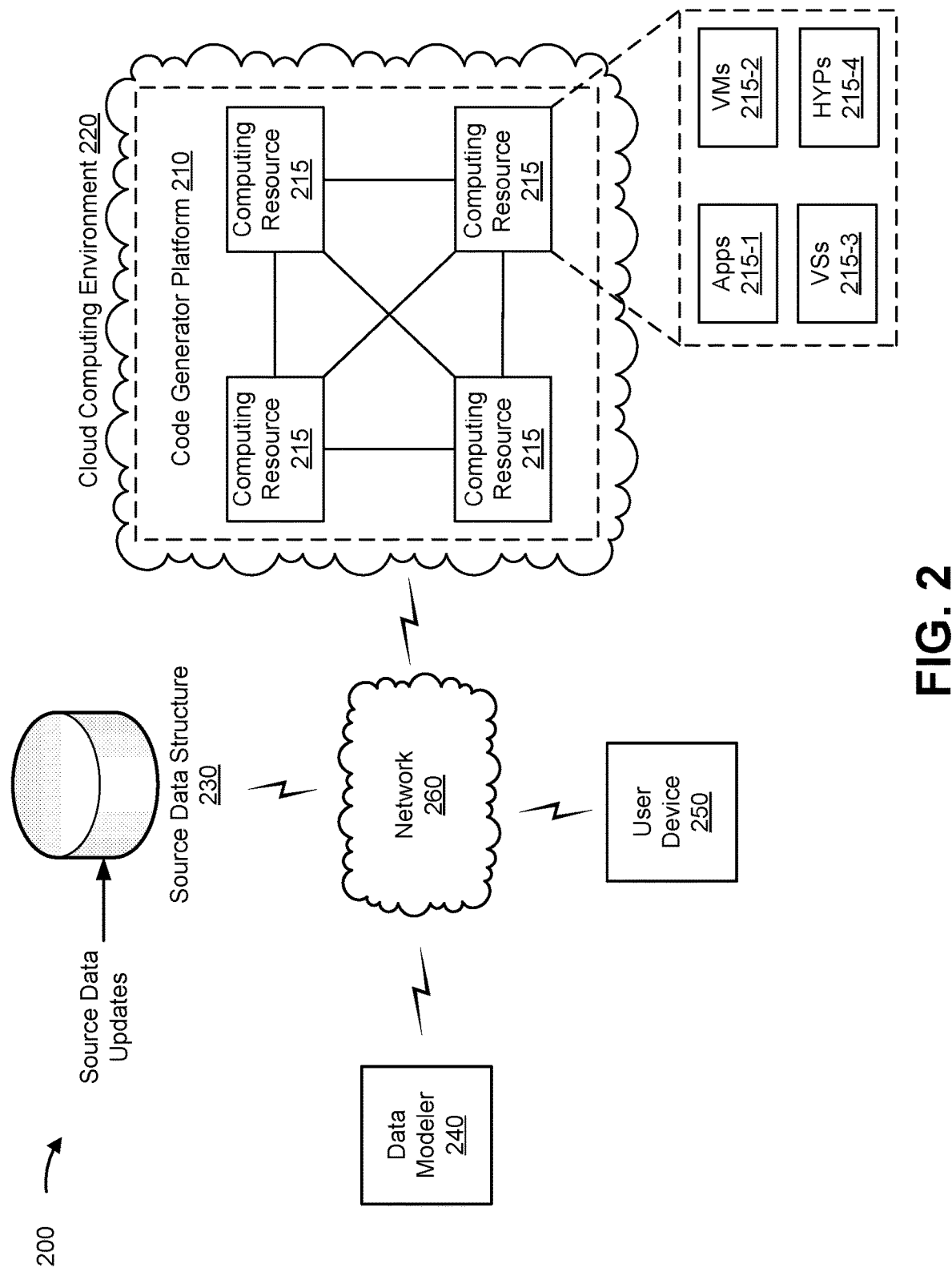
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a code generator platform 210, a computing resource 215, a cloud computing environment 220, a source data structure 230, a data modeler 240, a user device 250, and a network 260. Devices of environment 200 may interconnect via wired connections, wireless connections, or a combination of wired and wireless connections.

Code generator platform 210 includes one or more computing resources assigned to generate data transformation code associated with a source dataset, a target data model, and/or source metadata. For example, code generator platform 210 may be a platform implemented by cloud computing environment 220 that may receive the source dataset and the target data model, map attributes of the source dataset with parameters of the model, and generate the data transformation code according to the mapped attributes and parameters. In some implementations, code generator platform 210 is implemented by computing resources 215 of cloud computing environment 220.

Code generator platform 210 may include a server device or a group of server devices. In some implementations, code generator platform 210 may be hosted in cloud computing environment 220. Notably, while implementations described herein may describe code generator platform 210 as being hosted in cloud computing environment 220, in some implementations, code generator platform 210 may be non-cloud-based or may be partially cloud-based.

Cloud computing environment 220 includes an environment that delivers computing as a service, whereby shared resources, services, and/or the like may be provided to data modeler 240, user device 250, and/or the like. Cloud computing environment 220 may provide computation, software, data access, storage, and/or other services that do not require end-user knowledge of a physical location and configuration of a system and/or a device that delivers the services. As shown, cloud computing environment 220 may include code generator platform 210 and computing resources 215.

Computing resource 215 includes one or more personal computers, workstation computers, server devices, or another type of computation and/or communication device. In some implementations, computing resource 215 may host code generator platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 250. Application 215-1 may eliminate a need to install and execute the software applications on user device 250. For example, application 215-1 may include software associated with code generator platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 250), and may manage infrastructure of cloud computing environment 220, such as data management, synchronization, or long-duration data transfers. In some implementations, virtual machine 215-2 may include and/or correspond to a data engine (e.g., the data engine of example implementation 100).

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, virtualized storage 215-3 may store and/or include a target database (e.g., the target database of example implementation 100), a code repository (e.g., the code repository of example implementation 100), a metadata repository (e.g., the metadata repository of example implementation 100), and/or the like.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

Source data structure 230 includes one or more devices capable of storing source data in a source dataset (e.g., databases, tables, indexes, storage devices, and/or the like), as described herein. Data modeler 240 includes one or more devices capable of receiving, generating, storing, processing, and/or providing information associated with a data model (e.g., a target data model), as described herein. For example, data modeler may include a User device 250 includes one or more devices capable of receiving, generating, storing, processing, and/or providing information associated with updating a dataset (e.g., a source dataset in source data structure 230), or accessing a dataset (e.g., a target dataset that is generated or updated by a data engine, and/or the like). For example, user device 250 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. In some implementations, the user device may include a data engine (e.g., the data engine of example implementation 100), as described herein.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
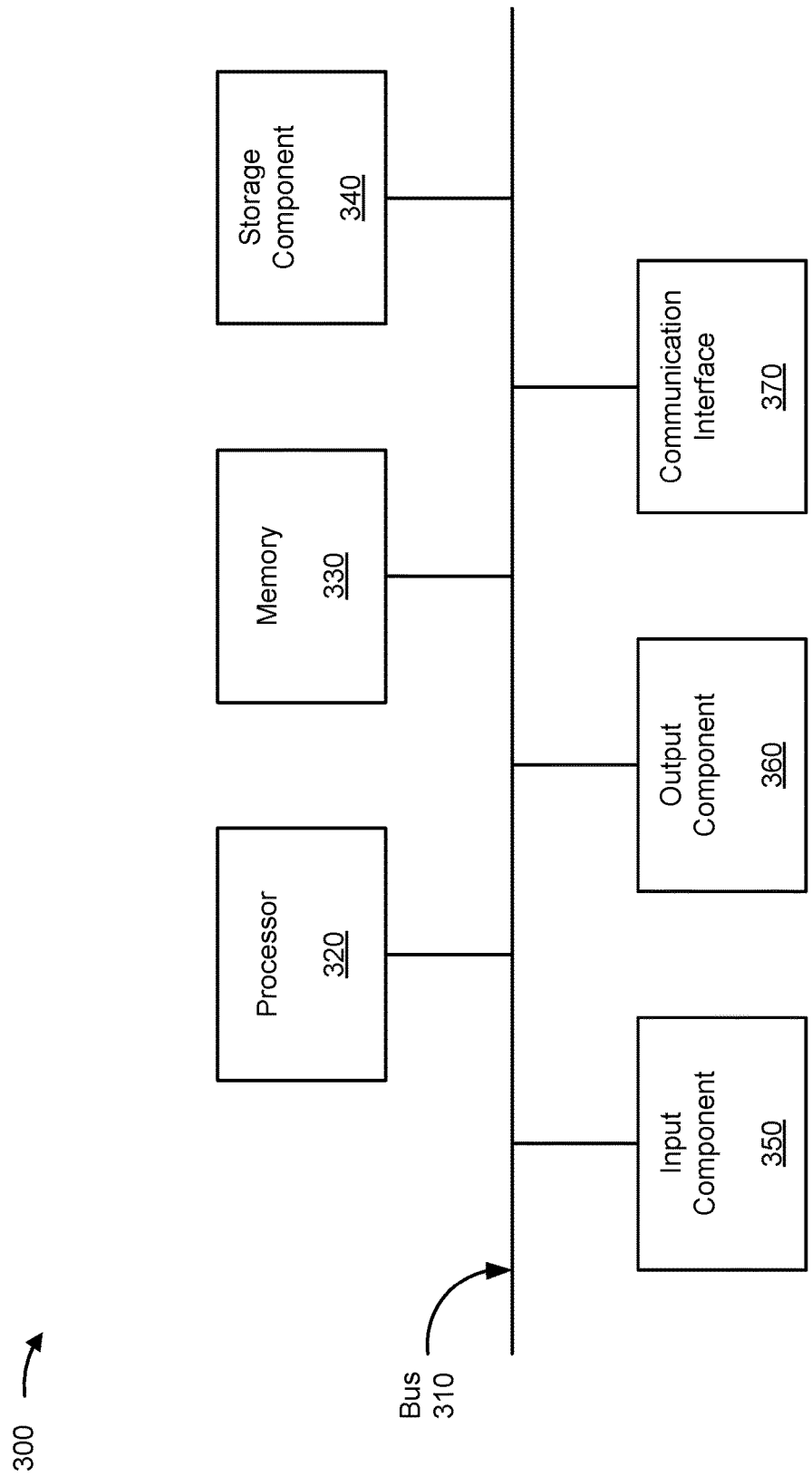
FIG. 3 is a diagram of example components of one or more devices of FIG. 2.

FIG. 3 is a diagram of example components of a device 300. Device 300 may correspond to code generator platform 210, computing resource 215, source data structure 230, data modeler 240, and/or user device 250. In some implementations, code generator platform 210, computing resource 215, source data structure 230, data modeler 240, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
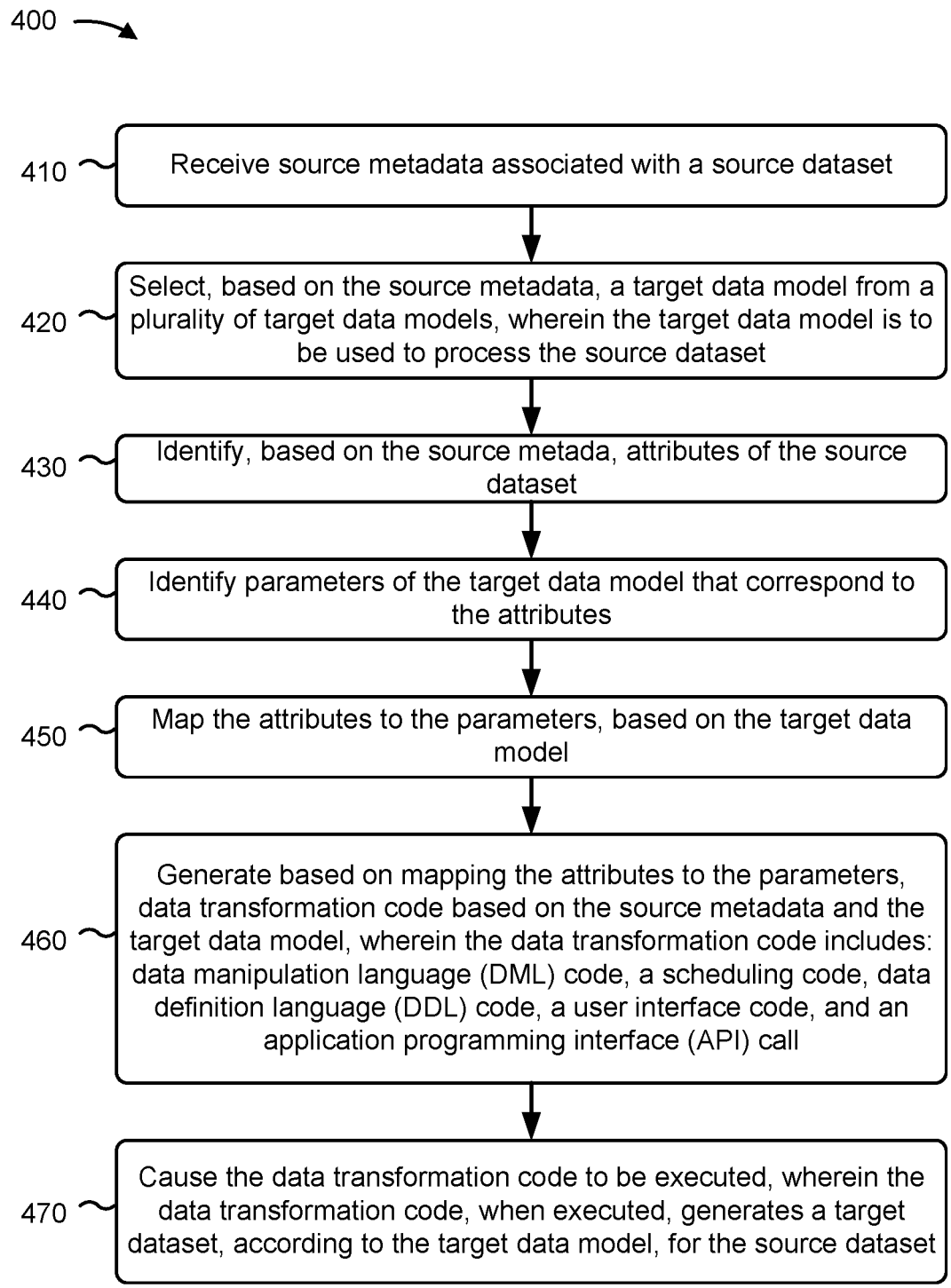
FIGS. 4-6 are flow charts of one or more example processes associated with a code generator platform for a data transformation.

FIG. 4 is a flowchart of an example process 400 associated with a code generator platform for a data transformation. In some implementations, one or more process blocks of FIG. 4 may be performed by code generator platform (e.g., code generator platform 210). In some implementations, one or more process blocks of FIG. 4 may be performed by another device or a group of devices separate from or including the code generator platform, such as a data modeler (e.g., data modeler 240), a user device (e.g., user device 250), and/or the like.

As shown in FIG. 4, process 400 may include receiving source metadata associated with a source dataset (block 410). For example, the code generator platform (e.g., using computing resource 215, processor 320, memory 330, storage component 340, input component 350, output component 360, communication interface 370 and/or the like) may receive source metadata associated with a source dataset, as described above.

As further shown in FIG. 4, process 400 may include selecting, based on the source metadata, a target data model from a plurality of target data models, wherein the target data model is to be used to process the source dataset (block 420). For example, the code generator platform (e.g., using computing resource 215, processor 320, memory 330, storage component 340, input component 350, output component 360, communication interface 370 and/or the like) may select, based on the source metadata, a target data model from a plurality of target data models, as described above. In some implementations, the target data model is to be used to process the source dataset.

As further shown in FIG. 4, process 400 may include identifying, based on the source metadata, attributes of the source dataset (block 430). For example, the code generator platform (e.g., using computing resource 215, processor 320, memory 330, storage component 340, input component 350, output component 360, communication interface 370 and/or the like) may identify, based on the source metadata, attributes of the source dataset, as described above.

As further shown in FIG. 4, process 400 may include identifying parameters of the target data model that correspond to the attributes (block 440). For example, the code generator platform (e.g., using computing resource 215, processor 320, memory 330, storage component 340, input component 350, output component 360, communication interface 370 and/or the like) may identify parameters of the target data model that correspond to the attributes, as described above.

As further shown in FIG. 4, process 400 may include mapping the attributes to the parameters based on the target data model (block 450). For example, the code generator platform (e.g., using computing resource 215, processor 320, memory 330, storage component 340, input component 350, output component 360, communication interface 370 and/or the like) may map the attributes to the parameters based on the target data model, as described above.

As further shown in FIG. 4, process 400 may include generating, based on mapping the attributes to the parameters, data transformation code based on the source metadata and the target data model, wherein the data transformation code includes data manipulation language (DML) code, a scheduling code, data definition language (DDL) code, a user interface code and an application programming interface (API) call (block 460). For example, the code generator platform (e.g., using computing resource 215, processor 320, memory 330, storage component 340, input component 350, output component 360, communication interface 370 and/or the like) may generate, based on mapping the attributes to the parameters, data transformation code based on the source metadata and the target data model, as described above. In some implementations, the data transformation code includes: DML code, a scheduling code, DDL code, a user interface code, and an API call.

As further shown in FIG. 4, process 400 may include causing the data transformation code to be executed wherein the data transformation code, when executed, generates a target dataset, according to the target data model, for the source dataset (block 470). For example, the code generator platform (e.g., using computing resource 215, processor 320, memory 330, storage component 340, input component 350, output component 360, communication interface 370 and/or the like) may cause the data transformation code to be executed, as described above. In some implementations, the data transformation code, when executed, generates a target dataset, according to the target data model, for the source dataset.

Process 400 may include additional implementations, such as any single implementation or any combination of implementations described below and/or in connection with one or more other processes described elsewhere herein.

In a first implementation, the DML code enables the target dataset to be generated based on an operation defined by the DML code. In a second implementation, alone or in combination with the first implementation, the scheduling code defines scheduling associated with generating the target dataset. In a third implementation, alone or in combination with one or more of the first and second implementations, the DDL code configures a format of the target dataset based on the target data model.

In a fourth implementation, alone or in combination with one or more of the first through third implementations, the user interface code defines role-based accessibility to the target dataset. In a fifth implementation, alone or in combination with one or more of the first through fourth implementations, the API call enables access to metadata in a metadata repository associated with the target data. In a sixth implementation, alone or in combination with one or more of the first through fifth implementations, after the data transformation code is generated, the DML, code, the scheduling code, the DDL code, and the user interface code are stored in a code repository, and the API call is stored in a metadata repository.

In a seventh implementation, alone or in combination with one or more of the first through sixth implementations, the DDL code is further stored in a target database in association with the target dataset to define data relationships of the target dataset, and the user interface code is stored in the target database in association with the target dataset to enable access to the target dataset.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
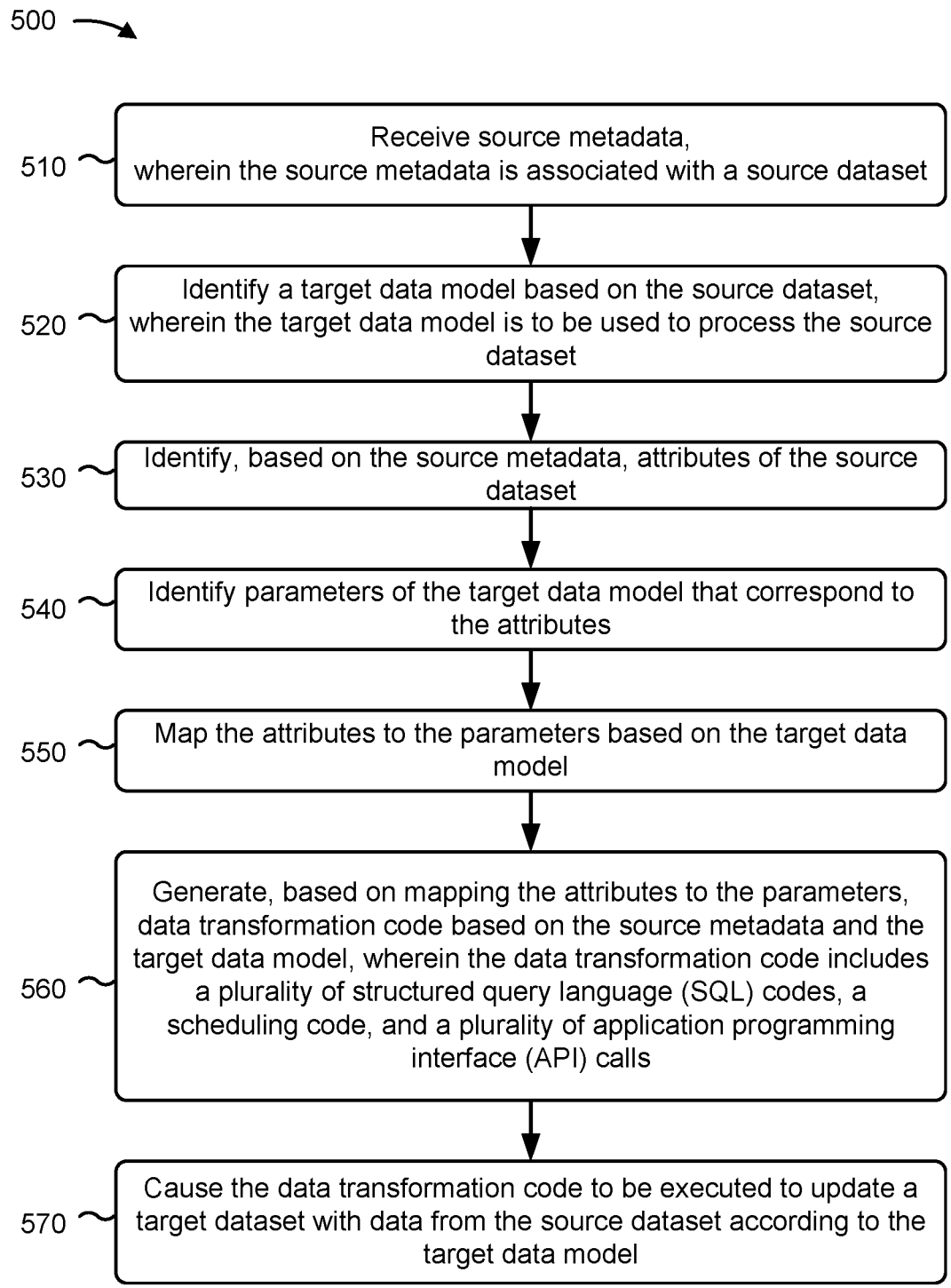

FIG. 5 is a flowchart of an example process 500 associated with a code generator platform for a data transformation. In some implementations, one or more process blocks of FIG. 5 may be performed by code generator platform (e.g., code generator platform 210). In some implementations, one or more process blocks of FIG. 5 may be performed by another device or a group of devices separate from or including the code generator platform, such as a data modeler (e.g., data modeler 240), a user device (e.g., user device 250), and/or the like.

As shown in FIG. 5, process 500 may include receiving source metadata, wherein the source metadata is associated with a source dataset (block 510). For example, the code generator platform (e.g., using computing resource 215, processor 320, memory 330, storage component 340, input component 350, output component 360, communication interface 370 and/or the like) may receive source metadata, as described above. In some implementations, the source metadata is associated with a source dataset.

As further shown in FIG. 5, process 500 may include identifying a target data model based on the source dataset, wherein the target data model is to be used to process the source dataset (block 520). For example, the code generator platform (e.g., using computing resource 215, processor 320, memory 330, storage component 340, input component 350, output component 360, communication interface 370 and/or the like) may identify a target data model based on the source dataset, as described above. In some implementations, the target data model is to be used to process the source dataset.

As further shown in FIG. 5, process 500 may include identifying, based on the source metadata, attributes of the source dataset (block 530). For example, the code generator platform (e.g., using computing resource 215, processor 320, memory 330, storage component 340, input component 350, output component 360, communication interface 370 and/or the like) may identify attributes of the source dataset, as described above.

As further shown in FIG. 5, process 500 may include identifying parameters of the target data model that correspond to the attributes (block 540). For example, the code generator platform (e.g., using computing resource 215, processor 320, memory 330, storage component 340, input component 350, output component 360, communication interface 370 and/or the like) may identify parameters of the target data model that correspond to the attributes, as described above.

As further shown in FIG. 5, process 500 may include mapping the attributes to the parameters based on the target data model (block 550). For example, the code generator platform (e.g., using computing resource 215, processor 320, memory 330, storage component 340, input component 350, output component 360, communication interface 370 and/or the like) may map the attributes to the parameters based on the target data model, as described above.

As further shown in FIG. 5, process 500 may include generating, based on mapping the attributes to the parameters, data transformation code based on the source metadata and the target data model, wherein the data transformation code includes a plurality of structured query language (SQL) codes, a scheduling code, and a plurality of API calls (block 560). For example, the code generator platform (e.g., using computing resource 215, processor 320, memory 330, storage component 340, input component 350, output component 360, communication interface 370 and/or the like) may generate, based on mapping the attributes to the parameters, data transformation code based on the source dataset, the source metadata, and the target data model, as described above. In some implementations, the data transformation code includes a plurality of SQL codes, a scheduling code, and a plurality of API calls.

As further shown in FIG. 5, process 500 may include causing the data transformation code to be executed to update a target dataset with data from the source dataset according to the target data model (block 570). For example, the code generator platform (e.g., using computing resource 215, processor 320, memory 330, storage component 340, input component 350, output component 360, communication interface 370 and/or the like) may cause the data transformation code to be executed to update a target dataset with data from the source dataset according to the target data model, as described above.

Process 500 may include additional implementations, such as any single implementation or any combination of implementations described below and/or in connection with one or more other processes described elsewhere herein.

In a first implementation, the plurality of SQL codes are generated from code templates associated with at least two of DML code associated with the target data model, DDL code associated with the target data model, or a user interface code associated with the target data model. In a second implementation, alone or in combination with the first implementation, the plurality of API calls, when accessed, are to provide record information from a metadata repository to the target database, and the record information is stored in the target database to track data lineage associated with the target database.

In a third implementation, alone or in combination with one or more of the first and second implementations, the record information includes at least one of timing information or source information associated with the source dataset. In a fourth implementation, alone or in combination with one or more of the first through third implementations, the parameters are associated with a user input that is associated with the source dataset, and the user input identifies a constraint associated with the attributes of the source dataset. In a fifth implementation, alone or in combination with one or more of the first through fourth implementations, the target dataset includes data in a dimensional model format that is different from a format of the source dataset.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
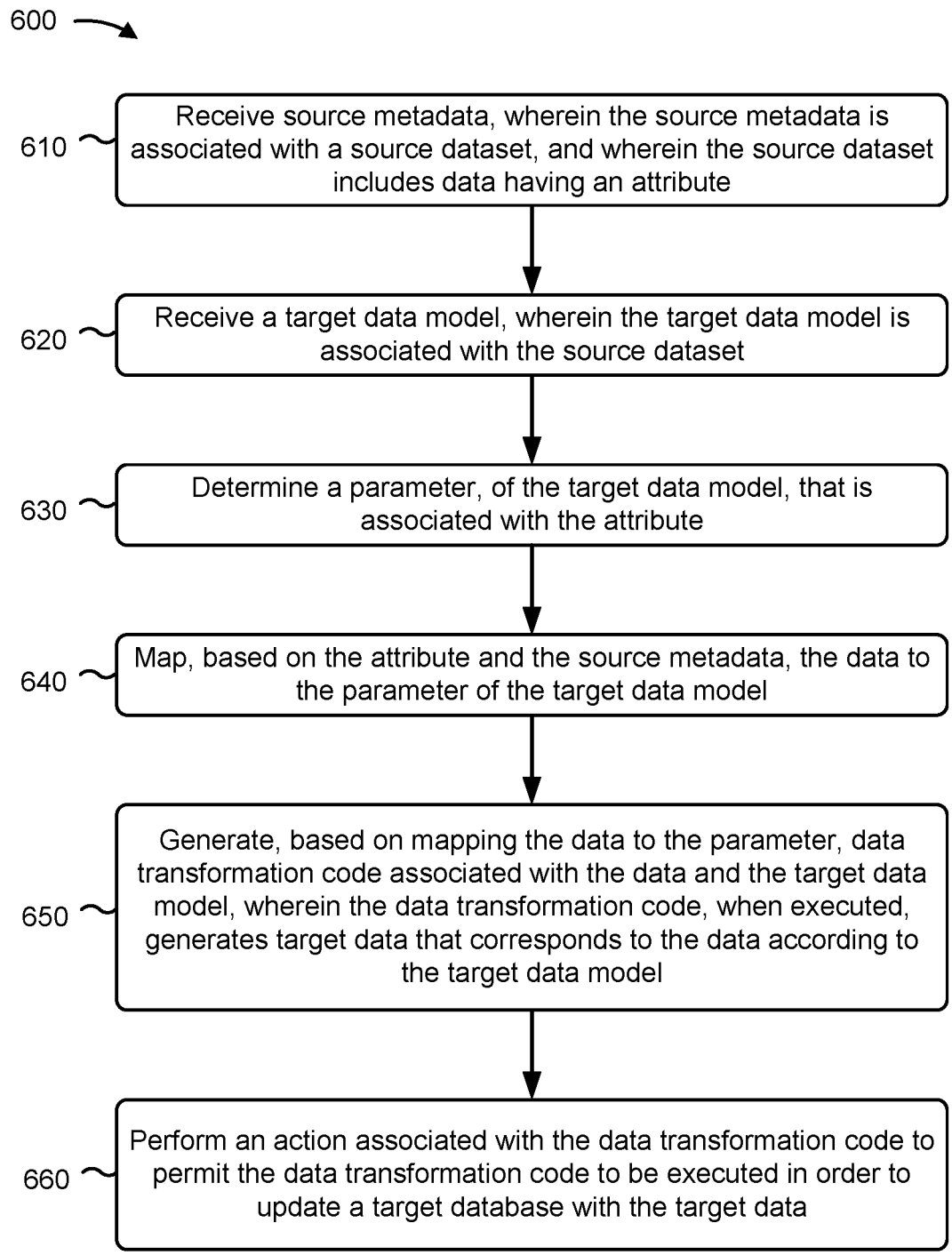

FIG. 6 is a flowchart of an example process 600 associated with a code generator platform for a data transformation. In some implementations, one or more process blocks of FIG. 6 may be performed by code generator platform (e.g., code generator platform 210). In some implementations, one or more process blocks of FIG. 6 may be performed by another device or a group of devices separate from or including the code generator platform, such as a data modeler (e.g., data modeler 240), a user device (e.g., user device 250), and/or the like.

As shown in FIG. 6, process 600 may include receiving source data, wherein the source metadata is associated with a source data set and wherein the source dataset includes data having an attribute (block 610). For example, the code generator platform (e.g., using computing resource 215, processor 320, memory 330, storage component 340, input component 350, output component 360, communication interface 370 and/or the like) may receive a source dataset, as described above. In some implementations, the source metadata is associated with a source dataset. In some implementations, the source dataset includes data having an attribute.

As further shown in FIG. 6, process 600 may include receiving a target data model, wherein the target data model is associated with the source dataset (block 620). For example, the code generator platform (e.g., using computing resource 215, processor 320, memory 330, storage component 340, input component 350, output component 360, communication interface 370 and/or the like) may receive a target data model, as described above. In some implementations, the target data model is associated with the source dataset.

As further shown in FIG. 6, process 600 may include determining a parameter, of the target data model, that is associated with the attribute (block 630). For example, the code generator platform (e.g., using computing resource 215, processor 320, memory 330, storage component 340, input component 350, output component 360, communication interface 370 and/or the like) may determine a parameter, of the target data model, that is associated with the attribute, as described above.

As further shown in FIG. 6, process 600 may include mapping, based on the attribute and the source metadata, the data to the parameter of the target data model (block 640). For example, the code generator platform (e.g., using computing resource 215, processor 320, memory 330, storage component 340, input component 350, output component 360, communication interface 370 and/or the like) may map, based on the attribute and the source metadata, the data to the parameter of the target data model, as described above.

As further shown in FIG. 6, process 600 may include generating, based on mapping the data to the parameter, data transformation code associated with the data and the target data model, wherein the data transformation code, when executed, generates target data that corresponds to the data according to the target data model (block 650). For example, the code generator platform (e.g., using computing resource 215, processor 320, memory 330, storage component 340, input component 350, output component 360, communication interface 370 and/or the like) may generate, based on mapping the data to the parameter, data transformation code associated with the data and the target data model, as described above. In some implementations, the data transformation code, when executed, generates target data that corresponds to the data according to the target data model.

As further shown in FIG. 6, process 600 may include performing an action associated with the data transformation code to permit the data transformation code to be executed in order to update a target database with the target data (block 660). For example, the code generator platform (e.g., using computing resource 215, processor 320, memory 330, storage component 340, input component 350, output component 360, communication interface 370 and/or the like) may perform an action associated with the data transformation code to permit the data transformation code to be executed in order to update a target database with the target data, as described above.

Process 600 may include additional implementations, such as any single implementation or any combination of implementations described below and/or in connection with one or more other processes described elsewhere herein.

In a first implementation, the data transformation code is configured to maintain data lineage associated with the data based on metadata associated with the data, and the data lineage is maintained using an API call to the metadata.

In a second implementation, alone or in combination with the first implementation, the data transformation code includes at least one of DML, code to generate the target data from the data, a scheduling code to define scheduling associated with generating the target data, DDL code to configure formatting for the data, a user interface code to configure user accessibility to the data, or an API call to obtain metadata for the data.

In a third implementation, alone or in combination with one or more of the first and second implementations, the data transformation code comprises a plurality of SQL codes, a scheduling code, and an API call associated with the data.

In a fourth implementation, alone or in combination with one or more of the first through third implementations, the target data model is associated with the source dataset based on the source dataset and based on at least one of: a mapping of a source, of the source dataset, to the target data model, the target data model and the source dataset being received from a same source, or a user input identifying the source dataset that is associated with the target data model.

In a fifth implementation, alone or in combination with one or more of the first through fourth implementations, the code generator platform, when performing the action, may store a DDL code, of the data transformation code, for the data in the target database in association with the data, store a user interface code of the data transformation code, for the data in the target database in association with the data and provide a DML code and a scheduling code to a data engine, wherein the DML code permits the data engine to generate the target data from the data according to the target data model and the scheduling code permits the data engine to generate the target data using event-based scheduling.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a device, a data model used to process a dataset,
  wherein the data model is received based on metadata associated with the dataset;
 determining, by the device, a parameter of the data model,
  wherein the parameter is associated with an attribute related to the dataset;
 generating, by the device and based on mapping data to the parameter, transformation code,
  wherein the transformation code, when executed, generates target data that corresponds to the data based on the data model; and
 causing, by the device, the transformation code to update a database with the target data.

2. The method of claim 1, wherein the data is mapped to the parameter based on the attribute and the metadata.

3. The method of claim 1, wherein the transformation code comprises a portion that is associated with scheduling the target data generation.

4. The method of claim 1, wherein the transformation code is configured to maintain data lineage associated with the data based on other metadata associated with the data.

5. The method of claim 1, wherein the target data includes dimensional model format data that is different from a format of the dataset.

6. The method of claim 1, wherein the parameter is associated with an input that identifies a constraint associated with the attribute of the dataset.

7. The method of claim 1, wherein one or more preconfigured data models are used to generate the transformation code.

8. A device, comprising:
 one or more memories; and
 one or more processors, coupled to the one or more memories, configured to:
  receive a data model used to process a dataset,
   wherein the data model is received based on metadata associated with the dataset;
  determine a parameter of the data model,
   wherein the parameter is associated with an attribute related to the dataset;
  generate transformation code,
   wherein the transformation code, when executed, generates target data that corresponds to the data based on the data model; and
  cause the transformation code to update a database with the target data.

9. The device of claim 8, wherein the data is mapped to the parameter based on the attribute and the metadata.

10. The device of claim 8, wherein the transformation code comprises a portion that is associated with scheduling the target data generation.

11. The device of claim 8, wherein the transformation code is configured to maintain data lineage associated with the data based on other metadata associated with the data.

12. The device of claim 8, wherein the target data includes dimensional model format data that is different from a format of the dataset.

13. The device of claim 8, wherein the parameter is associated with an input that identifies a constraint associated with the attribute of the dataset.

14. The device of claim 8, wherein one or more preconfigured data models are used to generate the transformation code.

15. A non-transitory computer-readable medium storing a set of instructions, the set of instructions comprising:
 one or more instructions that, when executed by one or more processors of a device, cause the device to:
  receive a data model used to process a dataset,
   wherein the data model is received based on metadata associated with the dataset;
  determine a parameter of the data model,
   wherein the parameter is associated with an attribute related to the dataset;
  generate transformation code,
   wherein the transformation code, when executed, generates target data that corresponds to the data based on the data model; and
  cause the transformation code to update a database with the target data.

16. The non-transitory computer-readable medium of claim 15, wherein the data is mapped to the parameter based on the attribute and the metadata.

17. The non-transitory computer-readable medium of claim 15, wherein the transformation code comprises a portion that is associated with scheduling the target data generation.

18. The non-transitory computer-readable medium of claim 15, wherein the one or more instructions further cause the device to maintain data lineage associated with the data based on other metadata associated with the data.

19. The non-transitory computer-readable medium of claim 15, wherein the target data includes dimensional model format data that is different from a format of the dataset.

20. The non-transitory computer-readable medium of claim 15, wherein the parameter is associated with an input that identifies a constraint associated with the attribute of the dataset.

* * * * *